US010176540B2

(12) United States Patent
Blackman et al.

(10) Patent No.: US 10,176,540 B2
(45) Date of Patent: Jan. 8, 2019

(54) APPARATUS AND METHOD FOR GENERATING TITLE PRODUCTS

(75) Inventors: David H. Blackman, Moreno Valley, CA (US); Terry A. Ehrhard, Fountain Valley, CA (US)

(73) Assignee: First American Title Insurance Company, Irvine, CA (US)

( * ) Notice: Subject to any disclaimer, the term of this patent is extended or adjusted under 35 U.S.C. 154(b) by 1078 days.

(21) Appl. No.: 11/872,613

(22) Filed: Oct. 15, 2007

(65) Prior Publication Data

US 2008/0091458 A1   Apr. 17, 2008

Related U.S. Application Data

(60) Provisional application No. 60/829,826, filed on Oct. 17, 2006.

(51) Int. Cl.
G06Q 50/16 (2012.01)
G06Q 10/08 (2012.01)

(52) U.S. Cl.
CPC .......... G06Q 50/16 (2013.01); G06Q 10/087 (2013.01)

(58) Field of Classification Search
CPC ....... G06Q 10/06; G06Q 10/067; G06Q 40/08
USPC .................................................... 705/1; 70/1
See application file for complete search history.

(56) References Cited

U.S. PATENT DOCUMENTS

| | | | |
|---|---|---|---|
| 5,521,815 A | 5/1996 | Rose, Jr. | |
| 5,692,206 A | 11/1997 | Shirley et al. | |
| 5,974,392 A * | 10/1999 | Endo | 705/7.14 |
| 6,076,064 A | 6/2000 | Rose, Jr. | |
| 6,766,322 B1 | 7/2004 | Bell | |
| 6,873,992 B1 | 3/2005 | Thomas | |
| 7,076,452 B2 | 7/2006 | Florance et al. | |
| 7,092,957 B2 | 8/2006 | Klein | |
| 7,171,389 B2 | 1/2007 | Harrison | |
| 7,283,909 B1 | 10/2007 | Olsen et al. | |
| 7,751,624 B2 | 7/2010 | Cantral | |
| 2002/0029194 A1 | 3/2002 | Lewis et al. | |
| 2003/0009345 A1 | 1/2003 | Thorpe | |
| 2003/0036922 A1 * | 2/2003 | Fries | 705/1 |
| 2003/0177071 A1 | 9/2003 | Treese et al. | |
| 2003/0187849 A1 | 10/2003 | Ruby et al. | |
| 2004/0019508 A1 | 1/2004 | Yaruss et al. | |
| 2004/0019544 A1 | 1/2004 | Yaruss et al. | |
| 2004/0044696 A1 | 3/2004 | Frost | |
| 2004/0059653 A1 * | 3/2004 | Verkuylen et al. | 705/35 |

(Continued)

OTHER PUBLICATIONS

Wikipedia, Search engine (computing), http://en.wikipedia.org/w/index.php?title=Search_engine_(computing)&oldid=24305510, Sep. 29, 2005.*

(Continued)

*Primary Examiner* — Dennis W Ruhl
(74) *Attorney, Agent, or Firm* — Snell & Wilmer L.L.P.

(57) ABSTRACT

The present invention provides an apparatus and method for generating title products. A device accepts a title product search request for a title product for a property. The device initiates a search of databases that contain information about the property such as data or evidence of title. A rule engine compares the retrieved information with business rules such as title insurance underwriting criteria. The comparison provides results for generating a title report, insurance contract or other title insurance products.

17 Claims, 13 Drawing Sheets

(56) References Cited

U.S. PATENT DOCUMENTS

| | | |
|---|---|---|
| 2004/0153432 A1 | 8/2004 | O'Halloran et al. |
| 2005/0004927 A1 | 1/2005 | Singer |
| 2005/0060203 A1* | 3/2005 | LaJoie et al. .................. 705/4 |
| 2005/0159963 A1 | 7/2005 | Gotschall |
| 2005/0187863 A1 | 8/2005 | Whinery et al. |
| 2005/0209867 A1 | 9/2005 | Diesch et al. |
| 2005/0209872 A1* | 9/2005 | Szymanski ............ G06Q 10/10 705/1.1 |
| 2005/0209873 A1 | 9/2005 | Anastasi |
| 2005/0209987 A1 | 9/2005 | Beres et al. |
| 2005/0210048 A1 | 9/2005 | Beres et al. |
| 2005/0210068 A1 | 9/2005 | Szymanski et al. |
| 2006/0020541 A1* | 1/2006 | Gommlich .................. 705/40 |
| 2006/0026136 A1* | 2/2006 | Drucker et al. .................. 707/3 |
| 2006/0064375 A1 | 3/2006 | Campagna |
| 2006/0080131 A1 | 4/2006 | Martin |
| 2006/0155559 A1 | 7/2006 | Richardson |
| 2006/0282376 A1 | 12/2006 | Goldberg et al. |
| 2007/0011190 A1 | 1/2007 | Finney |
| 2007/0078672 A1 | 4/2007 | Lee et al. |
| 2007/0097655 A1 | 5/2007 | Yampolsky et al. |
| 2007/0115936 A1 | 5/2007 | Newton |
| 2007/0174070 A1 | 7/2007 | Jafa et al. |
| 2007/0214096 A1 | 9/2007 | Newman et al. |
| 2007/0214120 A1* | 9/2007 | Niendorff .................. 707/3 |
| 2007/0217692 A1 | 9/2007 | Newcomer et al. |

OTHER PUBLICATIONS

ILOG, ILOG: Business Rule Management, http://web.archive.org/web/20050103025112/http://www.ilog.com/, Jan. 3, 2005.*

Jacobs, Harvey, "Title Insurance Secrets: Asking the Right Questions Can Save You Money", RealtyTimes, published Mar. 4, 1999, retrieved from http://realtytimes.com/rtpages/19990304_titleinsurance.htm on Jun. 13, 2013, pp. 3.*

"LegalWriter: Automate your legal survey descriptions. CADalyst, v 16, n 10, p. 35, Oct. 1999 (hereinafter LegalWriter)".

* cited by examiner

First American Title

Order Number:

2908197

For property at

11726 Hemlock Street

El Monte, CA 91732

FIG. 7A

DATE

2007-10-09

VESTING

JOSEPH T. LEYDEN AND LOLITA B. LEYDEN, HUSBAND AND WIFE, AS JOINT TENANTS

LEGAL DESCRIPTION

PARCEL 1: THE SOUTHERLY 89.40 FEET OF THE NORTHERLY 182.00 FEET OF THE EASTERLY 62.00 FEET OF LOT 2 OF TRACT 10834, AS PER MAP RECORDED IN BOOK 206, PAGE 9 OF MAPS, IN THE OFFICE OF THE COUNTY RECORDER OF SAID COUNTY. PARCEL 2: AN EASEMENT FOR INGRESS AND EGRESS AND PUBLIC UTILITIES PURPOSES OVER THE WESTERLY 16 FEET OF THE NORTHERLY 92.60 FEET OF LOT 2 OF TRACT 10834, AS PER MAP RECORDED IN BOOK 206, PAGE 9 OF MAPS, IN THE OFFICE OF THE COUNTY RECORDER OF SAID COUNTY.

Exceptions: 1

*Phrase Code:*ATPT/3
*Phrase Type:*Tax
*Phrase Description:*Taxes
*Phrase Text:*General and special taxes and assessments for the fiscal year 2007-2008.
    First Installment:     $742.51, Payable     Penalty: $     Second Installment:     $742.50, Payable     Penalty: $     Tax Rate Area:     23-03621     A. P. No.:     8541-006-042
*Waive Status:*No
*Status Code:*Success
*Sub Status Code:*Automated

FIG. 7B

*Data:*
AnnualInstal2PenaltyAmt :
AnnualInstal2Status : Payable
APN : 8541-006-042
FirstInstallmentAmount : 742.51
FirstInstallmentPenaltyAmount :
FirstInstallmentStatus : Payable
FiscalYear : 2007-2008
TaxRateArea : 23-03621
AnnualInstallAmount : 742.50
*Status Description(s):*

Exceptions: 2

*Phrase Code:*ATPT/6
*Phrase Type:*Tax
*Phrase Description:*Supplemental Taxes
*Phrase Text:*The lien of supplemental taxes, if any, assessed pursuant to Chapter 3.5 commencing with Section 75 of the California Revenue and Taxation Code.
*Waive Status:*No
*Status Code:*Success
*Sub Status Code:*Automated
*Data:*
*Status Description(s):*

Exceptions: 3

*Phrase Code:*ATPT/55
*Phrase Type:*Tax
*Phrase Description:*Lien of Bonds and Assessment Liens

FIG. 7C

*Phrase Text:*The lien of bonds and assessment liens, if applicable, collected with the general and special taxes.
*Waive Status:*No
*Status Code:*Success
*Sub Status Code:*Automated
*Data:*
*Status Description(s):*

Exceptions: 4

*Phrase Code:*ATPD/1
*Phrase Type:*Deed
*Phrase Description:*Deed of Trust
*Phrase Text:*A deed of trust to secure an original indebtedness of $143,500.00 recorded June 25, 1992 as Instrument No. 1159020 of Official Records.
    Trustor:    JOSEPH T. LEYDEN AND LOLITA B. LEYDEN    Trustee:    GOLDEN STATE BANK, F.S.B.    Beneficiary:    GOLDEN STATE BANK, F.S.B.
*Waive Status:*No
*Status Code:*Success
*Sub Status Code:*User Accept
*Data:*
Beneficiary : GOLDEN STATE BANK, F.S.B.
DateRecorded : June 25, 1992
OfOfficialEntity : of Official Records
RecordingInfo : Instrument No. 1159020
Trustee : GOLDEN STATE BANK, F.S.B.
Trustor : JOSEPH T. LEYDEN AND LOLITA B. LEYDEN
Amount : $143,500.00
*Status Description(s):*

Exceptions: 5

FIG. 7D

*Phrase Code:*ATPD/1
*Phrase Type:*Deed
*Phrase Description:*Deed of Trust
*Phrase Text:*A deed of trust to secure an original indebtedness of $100,112.00 recorded March 18, 2003 as Instrument No. 0763883 of Official Records.
    Trustor:    JOSEPH T. LEYDEN AND LOLITA B. LEYDEN    Trustee:    STEWART TITLE OF CALIFORNIA, INC.    Beneficiary:   BANK ONE, N.A.
*Waive Status:*No
*Status Code:*Success
*Sub Status Code:*User Accept
*Data:*
Beneficiary : BANK ONE, N.A.
DateRecorded : March 18, 2003
OfOfficialEntity : of Official Records
RecordingInfo : Instrument No. 0763883
Trustee : STEWART TITLE OF CALIFORNIA, INC.
Trustor : JOSEPH T. LEYDEN AND LOLITA B. LEYDEN
Amount : $100,112.00
*Status Description(s):*

Requirements: 1

*Phrase Code:*ATRN/25B
*Phrase Type:*Title Phrase
*Phrase Description:*Lender's Supplemental-24-month chain None
*Phrase Text:*According to the public records, there has been no conveyance of the land within a period of twenty-four months prior to the date of this report, except as follows:   None
*Waive Status:*No
*Status Code:*Success

FIG. 7E

*Sub Status Code:* Automated
*Data:*
*Status Description(s):*

STATUS

*Status:* LegalStatus
*Completed:* 100 *Status Code:* Success *LEGAL Sub Status Code:* User Accept
*Message:*

*Status:* VestingStatus
*Completed:* 100 *Status Code:* Success *Vesting Sub Status Code:* User Accept
*Message:*

*Status:* GILiensStatus
*Completed:* 100 *Status Code:* Success *GI LIENS Sub Status Code:* Automated
*Message:*

*Status:* ExceptionStatus
*Completed:* 100 *Status Code:* Review *Exception Sub Status Code:* System Reject
*Message:*
Note : Success : User Accept :
Alert : Review : System Reject : No Static Exceptions exist.

*Status:* ProcessStatus
*Completed:* 100 *Status Code:* Review *Process Sub Status Code:* System Reject

FIG. 7F

*Message:*
Alert : Review : System Reject : Transaction Type can not be automated.
Alert : Review : System Reject : GI needs to be reviewed.
Alert : Review : System Reject : Documents with Portions need to be reviewed.

FIG. 7G

APPARATUS AND METHOD FOR GENERATING TITLE PRODUCTS

CLAIM OF PRIORITY UNDER 35 U.S.C. § 119

The present Application for Patent claims priority to Provisional Application No. 60/829,826 entitled "APPARATUS AND METHOD FOR GENERATING TITLE PRODUCTS," filed Oct. 17, 2006, and assigned to the assignee hereof and hereby expressly incorporated by reference herein.

BACKGROUND

1. Field

The present invention relates to title products. More particularly, the present invention relates to an apparatus and method for generating title products related to insurance underwriting.

2. Related Art

The title insurance underwriting process has traditionally been a labor intensive process. Large financial institutions that underwrite title insurance employ large numbers of title examiners, abstractors and searchers. These individuals research title histories and laws to determine the possibility of a defect in title to a parcel of land. The research frequently requires searching databases for evidence of title and applying business rules to the evidence to generate title products for customers.

Title insurance protects land purchasers and loan institutions from defects in title. A land purchaser may purchase title insurance to protect from an unknown claim of title. A home purchaser may be required to obtain title insurance prior to obtaining a mortgage on a property. Mortgagees and note purchasers may purchase title insurance to protect their collateral interest in a mortgage. Lien holders may also purchase title insurance to protect their collateral interest in the landowner's debt.

In the underwriting process, the databases searched for evidence of title may be fairly extensive. For example, county databases may be searched for the chain of title for the parcel of land or property. Public record databases may be searched for evidence of mortgages or liens on the parcel of land or property. Court databases may be searched for evidence of judgment liens. Proprietary databases may also be searched for histories of title insurance. Any database containing information for evaluating the risk associated with underwriting title insurance for the parcel of land may be searched.

To make sound title underwriting decisions, a number of financial institutions have developed business rules to be applied as part of the underwriting process. The business rules allow employees at financial institutions to apply objective criteria to selecting and creating title products for a parcel of land or property. An analyst may compare evidence of title with business rules to determine underwriting risk, suitable title insurance products, and to determine if any other information about the land parcel should be acquired prior to making an underwriting decision. The business rules applied during the underwriting process may often vary according to the location of the parcel of land or property and the jurisdiction governing land ownership, taxation, recording and zoning.

The large amount of human effort required to generate a title product often results in significant delays or errors in the underwriting process. The title underwriter may have to search multiple databases for title evidence, compare the evidence with voluminous business rules, create a title report and generate a title insurance product. This may result in significant delays or errors in the acquisition of secured financing or in closing a real property transaction. The lengthy process also affects the sale of mortgages in secondary markets, decreases market liquidity and increases transaction time and cost.

Those skilled in the art will recognize that there is a need for faster more accurate systems and methods for generating title insurance products. The present invention addresses this need as well as others.

SUMMARY

The present invention may include a system and method for generating title products for use by financial institutions. A device (e.g., computer or workstation) may receive a search request for a title product. The search request may have the address, legal description, or other indicia of location of a parcel of land or property. A search engine may issue search queries to one or more databases to retrieve information about the parcel land or property. The retrieved information may then be processed and sent to a rule engine. The rule engine may apply underwriting or other business practice rules to the retrieved information. If the rule engine identifies missing information, the rule engine may send supplemental queries to system operators. The system operators may then key in the required information. The rule engine may return the results of applying the business practice rules. The device may generate a title report, refined title data, insurance contract or other title product.

In one embodiment, a method for generating a title product comprises receiving a title product request for a particular property, the title product request includes a type of title product, searching for title information related to the particular property, applying business practice rules to the title information to produce business practice results, and generating a title product using the business practice results.

BRIEF DESCRIPTION OF THE DRAWINGS

The features, objects, and advantages of the present invention will become more apparent from the detailed description set forth below when taken in conjunction with the drawings, wherein:

FIGS. 7A-7G shows an exemplary title product with the title product results according to an embodiment of the present invention.

DETAILED DESCRIPTION

Systems and methods that implement the embodiments of the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the present invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
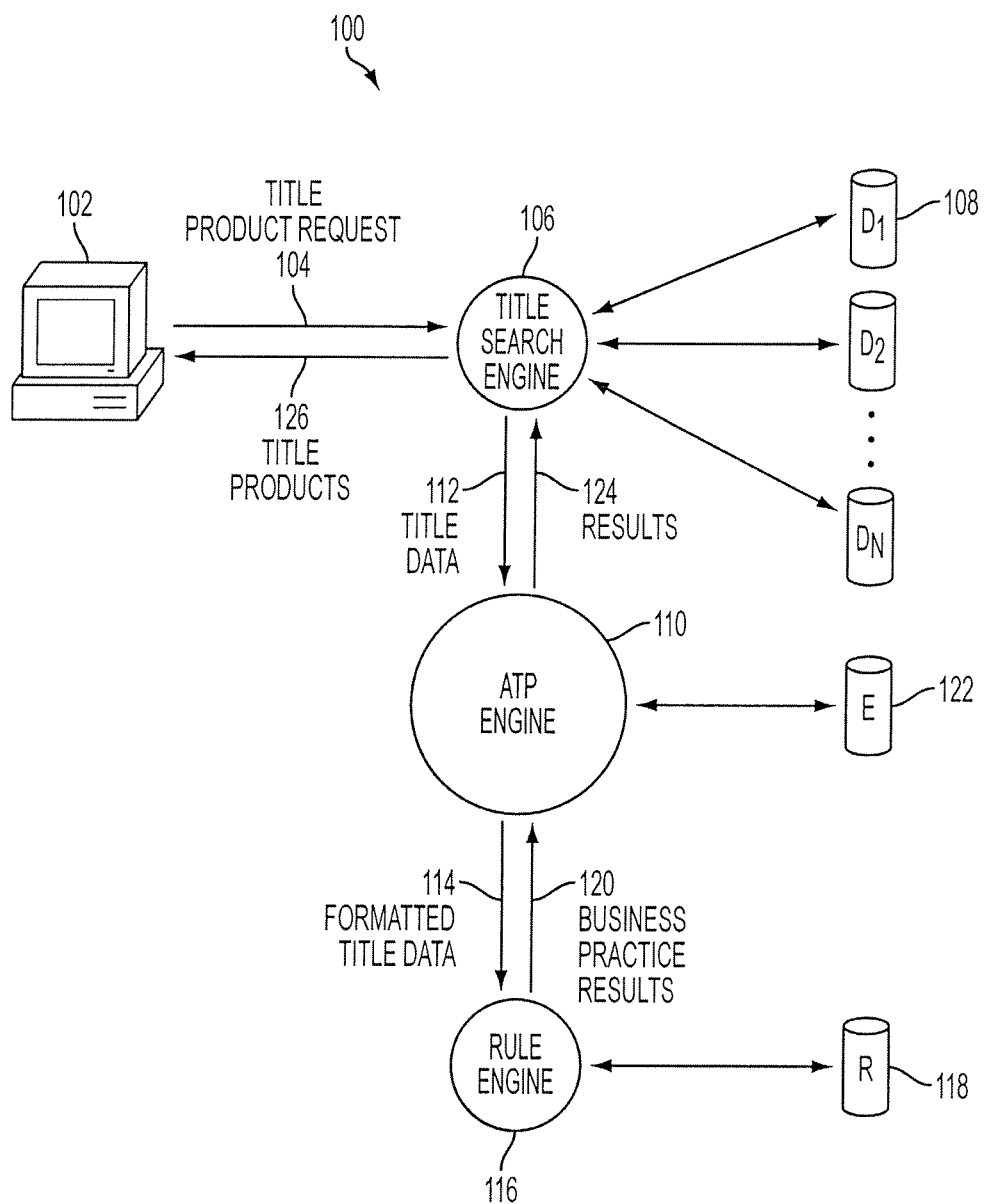
FIG. 1 is a block diagram of an apparatus for generating title products according to an embodiment of the present invention.

FIG. 1 is a block diagram of an apparatus 100 for generating title products (e.g., title reports) according to an embodiment of the present invention. The components or elements of apparatus 100 may be implemented using hardware, software, or a combination of hardware and software.

A device (e.g., computer, handheld, server, etc.) 102 may accept or receive a title product request for a title product (block 602). A user may select which product they want for a particular order. The device 102 may generate or initiate a title product request 104 for a title search engine 106. The title product request 104 may include the legal description of a parcel of land or property or other indicia of location such as an address, tax identifier, tract number or parcel number.

The title product request 104 may also include other information related to the parcel of land or property such as buyer and seller information. The buyer and seller information may include a buyer's full name or a seller's full name (e.g., first, middle, and last). The title product request 104 may specify the type of title product desired. For example, the type of title product may be a title report for a loan officer of a bank or an insurance contract for a prospective home buyer. Other examples of types of title products include ALTA Extended Owners, ALTA Standard Loan Policy, Eagle Loan Policy, and Legal, Vesting Information Report.

The title search engine 106 receives the title product request from the device 102. The title search engine 106 may query or search, using the title product request, one or more databases 108 for historical data about the parcel of land or property (block 604). The historical data may include title information such as a chain of title, a recorded document (e.g., deed, judgment, easement, etc.) and prior policies underwritten by a title company (e.g., by First American Title). The databases 108 may also have information regarding the status of title such as the tax status, legal status, vesting status, voluntary lien status, and judgment lien status. The databases 108 may also include encumbrances and other information related to title or potential defects in title. The title search engine 106 may query the databases 108 for any information relevant to make a title underwriting decision.

The databases 108 may be proprietary databases belonging to a financial institution, an insurance underwriter or a commercial information vendor. The databases 108 may also be vast proprietary databases 108 having multiple data-marts. The databases 108 may also be public databases such as a county recorder's database. The databases 108 may be electronic or may be libraries with paper records that require manual data entry for each query.

The title search engine 106 may interact with an automatic title product (ATP) engine 110. Title data 112 (e.g., the historical data and the encumbrance data) from the title search engine 106 may be sent to the ATP engine 110. The ATP engine 110 may parse and format the title data 112 to produce formatted title data 114 (block 606). The formatted title data 114 may be sent to a rule engine 116. The rule engine 116 may have a rule database 118 of business practice rules. The business practice rules may be any if—then structured rule. One example of a business practice rule is "if the current tax year has either installment with a status not equal to 'PAID' for tax type other than 'supplemental' then populate the T/3 phrase in the exception section." Another example of a business practice rule is "if both of the installments for the annual taxes exist and are paid, then include ATRN/T3 in the requirement section." Another example of a business practice rule is "if transaction type is sale and liability amount is greater than $750,000 or sale value is higher than $1,000,000, then raise alert and flag for secondary review." The rule engine 116 may apply the business practice rules to the formatted title data 114 to produce business practice results 120 (block 608). The business practice results 120 are data, outcomes or results of the business practice rules.

The business practice results 120 may be used by the ATP engine 110 to generate title product results 124 (block 610). The title product results 124 may include the date, vesting information, a legal description of the property, exceptions, requirements, status, and message. FIGS. 7A-7G shows an exemplary title product 126 with the title product results 124.

In one embodiment, the ATP engine 110 may query or search an exceptions database 122 to find one or more exceptions related to the parcel of land or property (block 612). Exceptions can be defined as items that are not covered for the property in question. Exceptions are exclusions to limit coverage on a title policy. Most title policies are limited as to what they cover and exceptions define specifically what is not covered for the property in question. Some examples of exceptions include judgments, easements, taxes, special assessments, mechanic's liens, mineral and/or water rights, and covenants, conditions, and restrictions (CC&R's). Exceptions are stored in the exception database 122. The title product results 124 may be sent to the title search engine 106 and the device 102. The ATP engine 110 and/or the title search engine 106 may use the title product results 124 and/or the one or more exceptions to generate title products 126 (block 614). The title product results 124 are the unique characteristics of the title products 126. The title products 126 also include boiler plate and generic information describing the conditions and details surrounding the coverage. The title product results 124 include specific information making the policy or title products 126 unique to the recipients (e.g., buyer, seller, and/or lender) and to the property in question.

The engines 106, 110 and 116 may be hosted on independent platforms and may share data via mark-up (e.g., XML) language or other networking language or protocol. The databases 118 and 122 may also be hosted on independent platforms and share data via XML or other networking language or protocol. Alternatively, the engines 106, 110 and 116 and the databases 118 and 122 may be hosted on a single platform or multiple platforms.

Figure 2:
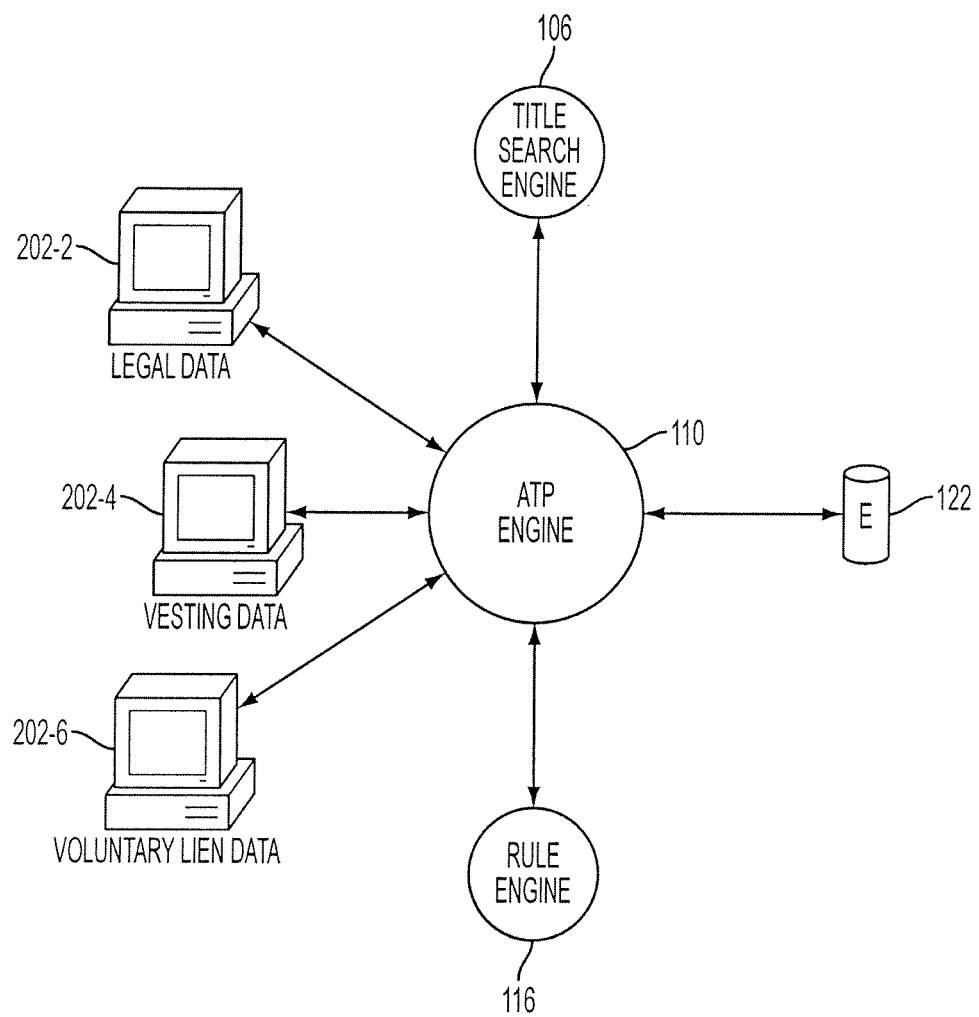
FIG. 2 is a block diagram of the automated title product (ATP) engine of FIG. 1 according to an embodiment of the present invention.

FIG. 2 is a block diagram of the ATP engine 110 of FIG. 1 according to an embodiment of the present invention. The ATP engine 110 may communicate with the title search engine 106 and the rule engine 116. The ATP engine 110 may also communicate with one or more workstations 202. The ATP engine 110 may receive information from the title search engine 106 and identify data that requires further attention. The data requiring further attention may be legal data, vesting data, voluntary lien data, for example, and the work requests may be sent to analysts for further processing. The work requests may be sent using XML to the one or more workstations 202. The workstations 202 may include a legal workstation 202-2, a vesting workstation 202-4, a voluntary lien workstation 202-6 or any other type of workstation (not shown). Analysts at the workstations 202 may process the work requests by making decisions or entering supplemental data.

Each of the workstations 202 may store work requests in a queue until an analyst is available. The use of multiple specialized workstations 202 with skilled analysts at each of the workstations 202 speeds up the title product generation process. However, the use of a single workstation 202 or non-specialized workstations and analysts is also contemplated.

A scheduler (not shown) may be used to ensure the timely production of data products. The scheduler may, for example, allocate thirty minutes for processing of work requests or any other task to be completed. After expiration of a predetermined time period, the scheduler may cue the ATP engine 110 to begin executing the next task.

After the search is complete and the analysts have processed the work requests by, for example, entering any supplemental data via the workstations 202, the ATP engine 110 may package the data retrieved by the title search engine 106 or entered at one of the workstations 202 for further processing by the rule engine 116. The rule engine 116 may apply business practice rules and may supply the results to the ATP engine 110. The ATP engine 110 may query the exception database 122 for exception data related to the parcel of land or property. The exception data may include, for example, new data that affects the parcel of land or property since the date the plat map data was retrieved from an earlier search. The ATP engine 110 may also include components for processing data related to a vesting, a legal description, a site address, a tax ID number, standard exception information, and any requirements associated with the parcel of land or property.

Figure 3:
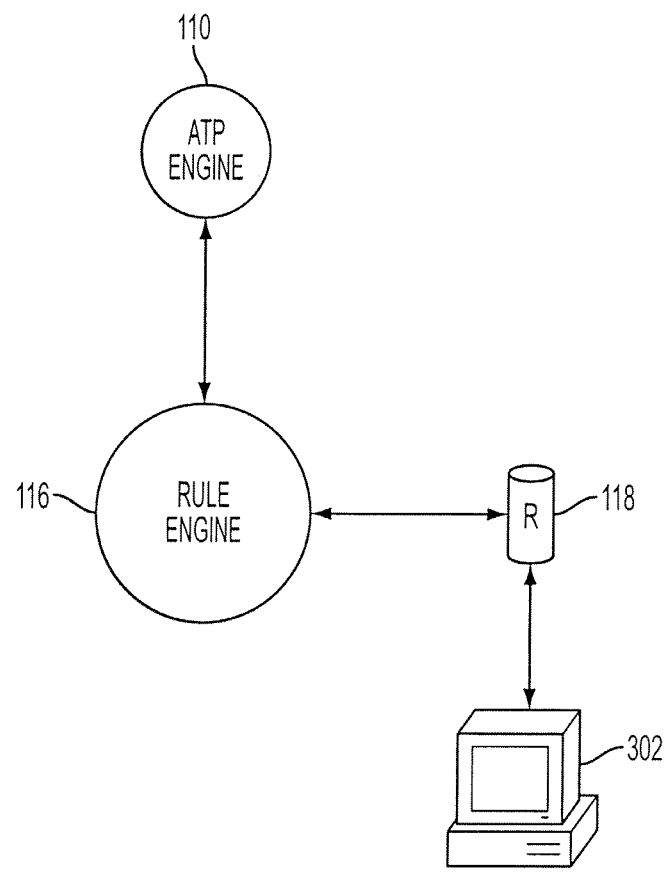
FIG. 3 is a block diagram of the rule engine of FIG. 1 according to an embodiment of the present invention.

FIG. 3 is a block diagram of the rule engine 116 of FIG. 1 according to an embodiment of the present invention. The rule engine 116 may communicate with the ATP engine 110 and with the rule database 118. The rule engine 116 may receive data from the ATP engine 110 and apply the business rules stored in the rule database 118 to generate business practice results 120. The rule database 118 rules may be updated using a rule workstation 302. A system operator with special access privileges may update the rule database 118 because of changes in underwriting practice, changes to title products, changes in laws, changes in underwriting risk profiles or any other reason that warrants a business rule change.

The rule engine 116 may employ a standard business process management (BPM) engine. The SBM engine may be implemented in software and installed with Windows 2000 and Microsoft Sequel Server 2000 providing an integrated rule engine 116 and a rule database 118. The installation provides a convenient processing platform for the rule engine 116. The scope of the invention, however, is not limited to a rule engine 116 with a BPM engine; other rule engine 116 configurations are also contemplated. The rule database 118 and the rule engine 116 may be integrated or federated. The rule engine 116 may have decision points to determine whether, for instance, task A has been processed or task B has been processed.

Figure 4:
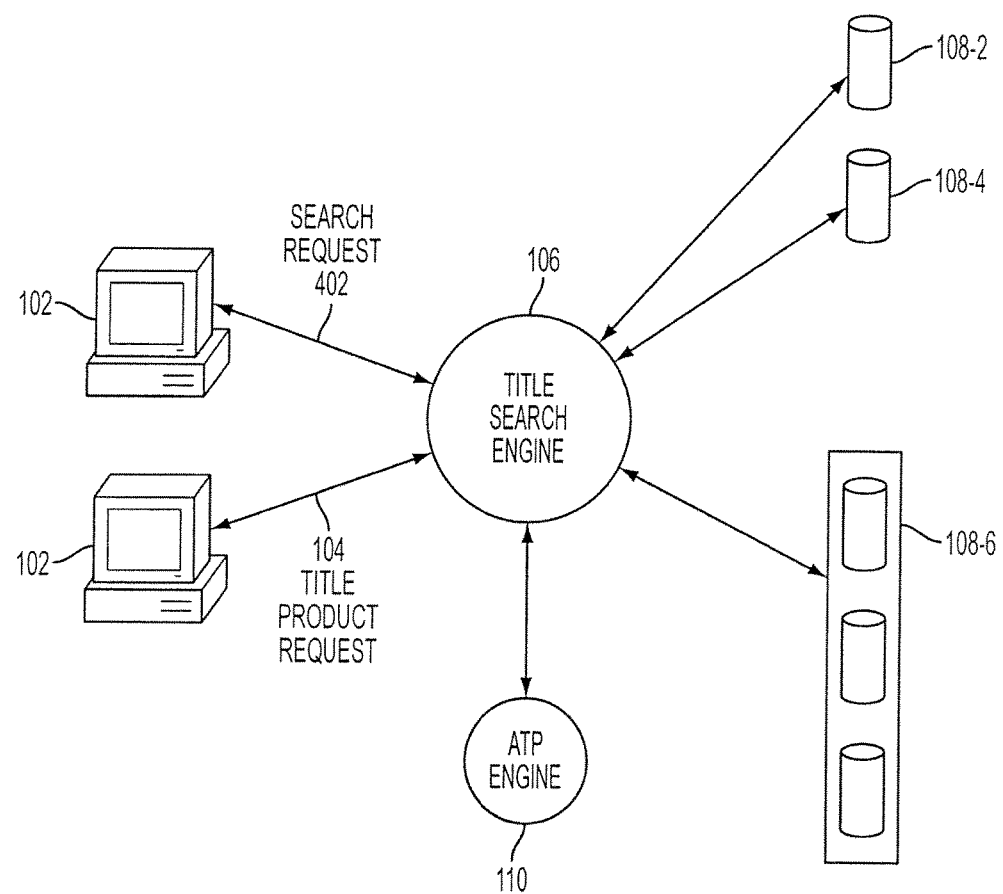
FIG. 4 is a block diagram of the title search engine of FIG. 1 according to an embodiment of the present invention.

FIG. 4 is a block diagram of the title search engine 106 of FIG. 1 according to an embodiment of the present invention.

The title search engine 106 may communicate with the device 102. The title search engine 106 may accept title product requests 104 as well as traditional search requests 402. The title search engine 106 may query multiple databases having information relevant to the title product request 104 or the search request 402. The queried databases may include a county recorder's database 108-2, a mortgage database 108-4, and a proprietary database 108-6 containing multiple data-marts having information about the parcel of land or property. The title search engine 106 may format the results of the search request 402 providing them to the device 102 for display or printout.

The results are formatted to organize the data found in the title search in a more comprehensible format. For example, the results may be provided as an Adobe PDF (Portable Document Format) file. The results include any errors found while searching and describe the documents provided and the documents ignored. The documents provided are relevant documents pertaining to the current status of the property and the documents ignored are outdated documents that no longer apply because the relevant documents superseded them. The results may include screen shots of data found during the search from databases located at various public agencies.

The title search engine 106 may also send the search results to the ATP engine 110 for further processing and generation of a title product. The ATP engine 110 may return results to the title search engine 106. The title search engine 106 may process the results for display or printout by one or more devices 102.

Figure 5:
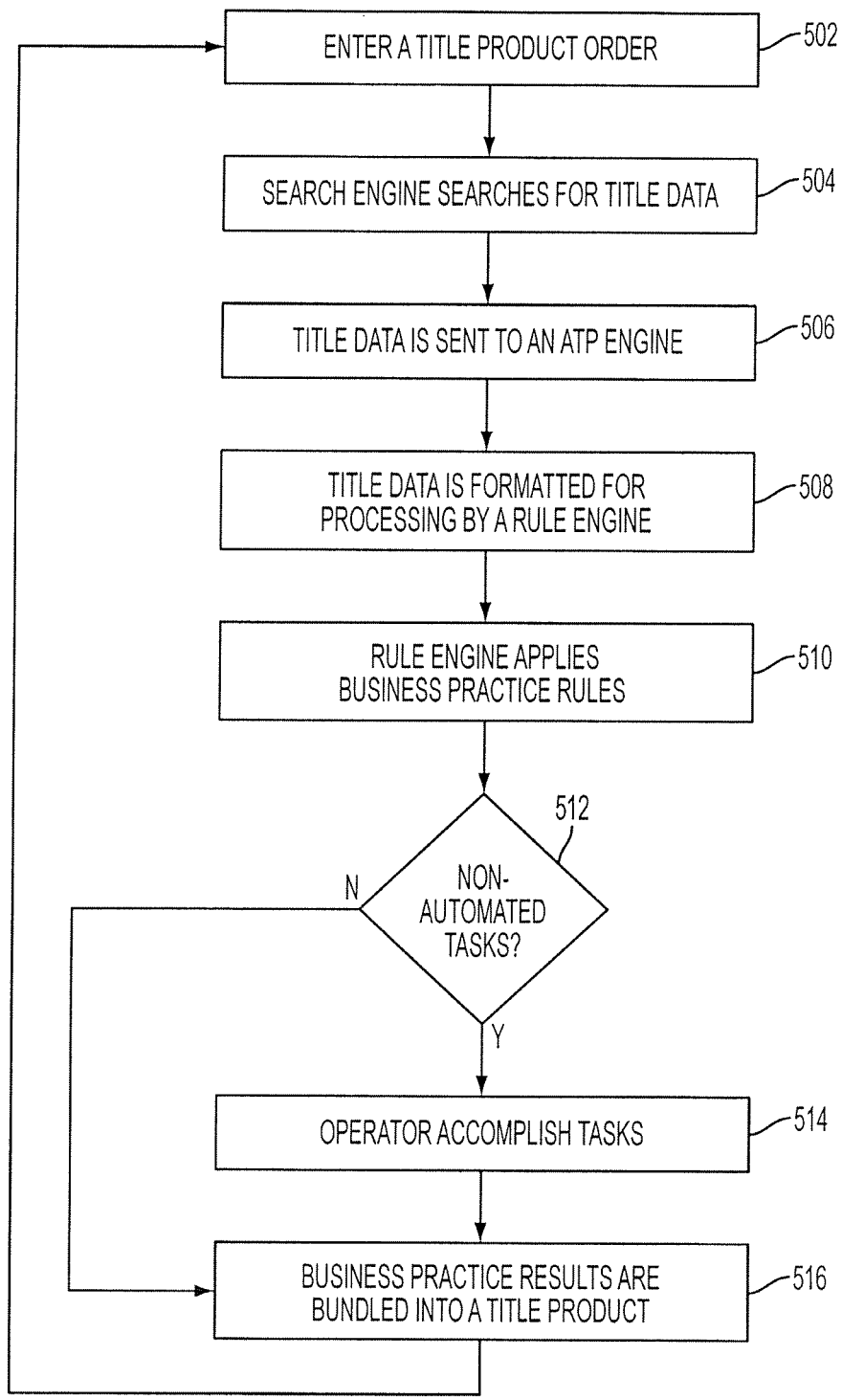
FIG. 5 is a flow diagram of a method of generating title products according to an embodiment of the present invention.
Figure 6:
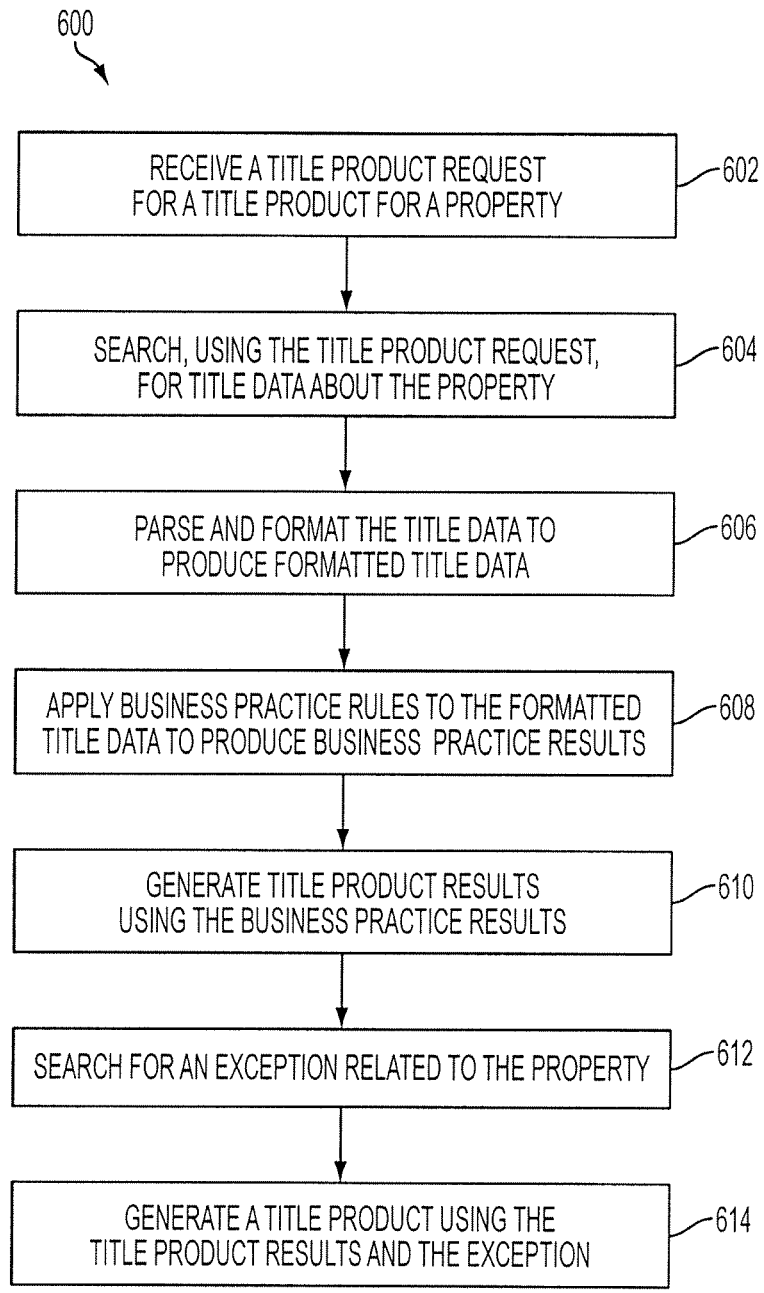
FIG. 6 is a flow diagram of a method of generating title products according to an embodiment of the present invention.

FIG. 5 is a flow diagram of a method 500 of generating title products according to an embodiment of the present invention. An order for a title product may be entered into the device 102 (block 502). The order for the title product may contain the legal description or other indicia of location for a parcel of land or property. The device 102 may search for data relating to the title in one or more land information databases (block 504). The title data retrieved from the search may be sent to the ATP engine 110 (block 506). The ATP engine 110 may format the title data for processing by the rule engine 116 (block 508). The rule engine 116 may control the SBM engine. The rule engine 116 may apply business practice rules and title insurance underwriting rules (block 510). The ATP engine 110 may determine whether any non-automated tasks are needed (block 512). If so, the tasks are sent to an operator to perform the non-automated tasks (block 514). The business practice results are bundled or combined into a title product (block 516).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the present invention is, therefore, indicated by the appended claims rather than by the foregoing description. All changes which come within the meaning and range of equivalency of the claims are to be embraced within their scope.

What is claimed is:

1. A method performed by a computing device having a search engine, a title product engine, and a rule engine, the method comprising:

receiving, by a computer and via the search engine and from a user computing device operated by a user, a title product request for a particular property, the title product request including a type of title product;

searching, by the computer and via the search engine, title information related to the particular property, the title information stored in at least one of a recorder database, a mortgage database or a proprietary database;

parsing and formatting, by the computer, the title information to transform the title information into a format that is identified by the title product engine;

identifying, by the title product engine, that the title information requires further attention;

sending, by the title product engine, a work request to at least one of a plurality of workstations, the plurality of workstations including a legal workstation, a vesting workstation, or a voluntary lien workstation;

processing, by the title product engine, the work requests by entering supplemental data;

producing, by the title product engine, processed data that includes the title information and the supplemental data, wherein the supplemental data includes at least one of legal data, vesting data, or voluntary lien data;

storing, by a scheduler, the work request in a cue of at least one of the plurality of workstations;

allocating, by the scheduler, a predetermined time period for the work request on at least one of the plurality of workstations;

sending, by the scheduler, the cue to the title product engine to begin executing a next task among at least one of the plurality of workstations;

receiving, at the title product engine, the cue from the scheduler to begin executing the next task in generating the title product after the predetermined time period associated with the work request expires;

packaging, by the title product engine, the processed data with the title information to produce packaged title information;

applying, by a rule server and via the rule engine, business practice rules stored in a rule database to the packaged title information to produce business practice results, updating, by the rule server, the business practice rules in the rule database;

searching, by the title product engine, to obtain exception data for the particular property in an exception database in response to applying the business practice rules;

determining, by the title product engine, an exception related to the particular property based on the exception data and in response to at least one of the applying the business practice rules or searching the exception database;

supplementing, by the title product engine, the title product with errors found, documents provided and documents ignored, wherein the documents ignored are outdated documents that no longer apply because relevant documents supersede the documents ignored; and generating, by the title product engine, the title product using the business practice results and the exception related to the particular property.

2. The method of claim 1 wherein the type of title product is selected from a group consisting of a title report, a title policy, a loan policy, a legal information report, a vesting information report, and combinations thereof.

3. The method of claim 1 wherein the title information includes a chain of title, a recorded document, a prior policy underwritten by a title company, or any combinations thereof.

4. The method of claim 1 wherein the title information includes tax status, legal status, vesting status, voluntary lien status, judgment lien status, or any combinations thereof.

5. The method of claim 1 further comprising searching, by the search engine, for encumbrance information related to the particular property.

6. The method of claim 1 further comprising searching for, by the search engine, the title information related to the particular property using a prior policy underwritten by a title company.

7. The method of claim 6 further comprising searching for, by the search engine, the title information related to the particular property using the proprietary database for prior policies underwritten by the title company.

8. The method of claim 1, wherein the generating includes displaying the title product.

9. A method performed by a computing device having a search engine, a rule engine, and a title product engine, the method comprising:

receiving, by a computer and via the search engine and from a user computing device operated by a user, a title product request for a particular property;

searching, by the computer and via the search engine, title data including vesting data, historical data and encumbrance data related to the particular property, the title data stored in at least one of a recorder database, a mortgage database or a proprietary database;

parsing and formatting, by the computer, the title data to transform the title information into a format that is identified by the title product engine;

searching, by the search engine, the title data using a prior policy underwritten by a title company;

identifying, by the title product engine, that the title information requires further attention;

sending, by the title product engine, a work request to at least one of a plurality of workstation, the plurality of workstations including a legal workstation, a vesting workstation, or a voluntary lien workstation;

processing, by the title product engine, the work requests by entering supplemental data;

producing, by the title product engine, processed data that includes the title information and the supplemental data, wherein the supplemental data includes at least one of legal data, vesting data, or voluntary lien data;

storing, by a scheduler, the work request in a cue of at least one of the plurality of workstations;

allocating, by the scheduler, a predetermined time period for the work request on at least one of the plurality of workstations;

sending, by the scheduler, the cue to the title product engine to begin executing a next task among at least one of the plurality of workstations;

receiving, at the title product engine, the cue from the scheduler to begin executing the next task in generating the title product after the predetermined time period associated with the work request expires;

packaging, by the title product engine, the processed information with the title data to produce packaged title data;

formatting the packaged title data, by the title product engine, to produce formatted title data;

applying, by a rule server and via the rule engine, business practice rules stored in a rule database to the formatted title data to produce business practice results;

updating, by the rule server, the business practice rules in the rule database;

searching, by the title product engine, to obtain exception data for the particular property in an exception database in response to applying the business practice rules;

determining, by the title product engine, an exception related to the particular property based on the exception data and in response to at least one of the applying the business practice rules or searching the exception database;

generating, by the title product engine, title product results using the business practice results, the title product results including vesting information, a legal description of the particular property, the exception related to the particular property, a requirement, and a status; and supplementing, by the title product engine, the title product with errors found, documents provided and documents ignored, wherein the documents ignored are outdated documents that no longer apply because relevant documents supersede the documents ignored; and generating, by the title product engine, the title product using the title product results.

10. A distributed computing system comprising:

a search engine that receives a title product request for a particular property from a user computing device operated by a user, the title product request including a type of title product, and for searching for title information related to the particular property, the title information stored in at least one of a recorder database, a mortgage database or a proprietary database;

a title product engine that identifies that the title information requires further attention, sends a work request to at least one of a plurality of workstations data to produce processed data, the plurality of workstations including a legal workstation, a vesting workstation, and a voluntary lien workstation, and processes the work requests by entering supplemental data, wherein the supplemental data includes at least one of legal data, vesting data, or voluntary lien data;

a scheduler that stores the work request in a cue of at least one of the plurality of workstations and allocates a predetermined time period for the work request on at least one of the plurality of workstations and sends the cue to the title product engine to begin executing a next task among at least one of the plurality of workstations;

the title product engine that receives the cue from the scheduler to begin executing the next task in generating the title product after the predetermined time period associated with the work request expires;

a rule server comprising a rule engine that applies business practice rules stored in a rule database to the packaged title information to produce business practice results, and updates the business practice rules in the rule database;

the title product engine that searches for exception data for the particular property in an exception database in response to applying the business practice rules, determining an exception related to the particular property based on the exception data in response to at least one of the applying the business practice rules or searching the exception database, and generating the title product using the business practice results and the exception related to the particular property; and the title product engine that supplements the title product with errors found, documents provided and documents ignored, wherein the documents ignored are outdated documents that no longer apply because relevant documents supersede the documents ignored.

11. The system of claim 10 wherein the type of title product is selected from a group consisting of a title report, a title policy, a loan policy, a legal information report, a vesting information report, and combinations thereof.

12. The system of claim 10 wherein the title information includes a chain of title, a recorded document, or any combinations thereof.

13. The system of claim 10 wherein the title information includes tax status, legal status, vesting status, voluntary lien status, judgment lien status, or any combinations thereof.

14. The system of claim 10 wherein the search engine searches for encumbrance information related to the particular property.

15. The system of claim 10 wherein the exception is selected from a group consisting of a judgment, an easement, a tax, a special assessment, a mechanic's lien, a mineral and/or water right, covenants, conditions, and restrictions, and combinations thereof.

16. The system of claim 10 wherein the rule engine employs a business process management device.

17. The system of claim 10 wherein the rule engine tracks a list of tasks and determines whether the list of tasks has been performed.

* * * * *